United States Patent [19]

Nakamura et al.

[11] Patent Number: 4,720,201

[45] Date of Patent: Jan. 19, 1988

[54] PRINTER GUIDE MEMBER

[75] Inventors: Kiyoshi Nakamura; Syozi Okada, both of Yokohama; Toshio Kumiyama, Chiba, all of Japan

[73] Assignee: Kabushiki Kaisha Toshiba, Kawasaki, Japan

[21] Appl. No.: 777,738

[22] Filed: Sep. 19, 1985

[30] Foreign Application Priority Data

Sep. 27, 1984 [JP] Japan ................................ 59-202716

[51] Int. Cl.[4] .......................... B41J 3/12; C04B 35/58

[52] U.S. Cl. ................................ 400/124; 101/93.05; 501/97

[58] Field of Search ............................... 400/124, 694; 101/93.05; 501/97

[56] References Cited

U.S. PATENT DOCUMENTS

| | | | |
|---|---|---|---|
| 4,459,363 | 7/1984 | Holt | 501/97 X |
| 4,547,470 | 10/1985 | Tanase | 501/97 X |

FOREIGN PATENT DOCUMENTS

| | | | |
|---|---|---|---|
| 15421 | 9/1980 | European Pat. Off. | 501/97 |
| 35777 | 9/1981 | European Pat. Off. | 501/97 |
| 2512333 | 10/1976 | Fed. Rep. of Germany | 400/124 |
| 167172 | 12/1980 | Japan | 501/97 |
| 954285 | 4/1964 | United Kingdom | 501/97 |

*Primary Examiner*—Paul T. Sewell

*Attorney, Agent, or Firm*—Cushman, Darby & Cushman

[57] ABSTRACT

A printer guide member for guiding print wires in a dot matrix printer, which comprises a thin ceramic sintered body containing 60% by weight or more of $Si_3N_4$ and having a plurality of guide holes perforated therethrough. In addition to $Si_3N_4$, this thin ceramic sintered body further includes (a) not more 10% by weight of $Al_2O_3$ and (B) at least one component as an additive selected from the group consisting of (i) not more than 10% by weight of a rare earth element oxide, (ii) not more than 10% by weight of AlN, and (iii) not more than 10% by weight of at least one oxide selected from the group consisting of $TiO_2$, MgO and $ZrO_2$.

11 Claims, 2 Drawing Figures

PRINTER GUIDE MEMBER

BACKGROUND OF THE INVENTION (a) Field of the Invention

The present invention relates to a printer guide member with improved wear resistance, and, more particularly, to a guide member suitably adapted as a printer wire guide for a dot matrix printer.

(b) Description of the Prior Art

A dot matrix printer selectively moves a plurality of print wires and urges them onto printing paper to print desired information. A printer of this type has a wire guide member for holding the respective printer wires at predetermined intervals. For this purpose, the wire guide member has a plurality of aligned guide holes through which the printer wires are movably inserted.

In the wire guide member, the printer wires move very frequently and in sliding contact with the guide holes. When the guide holes wear and the hole diameters increase due to such frequent movement of the printer wires, the printer wire holding positions are rendered unstable or deviate from the normal positions, thus degrading the printing quality. In view of this problem, in order to hold printer wires stable in a wire guide member, the member must have wear resistance to prevent wear of guide hole portions.

Printer wires normally comprise piano or tungsten wires. High-quality printer wires comprise tungsten carbide (WC). For printer wires made of such materials, it has been proposed to manufacture a wire guide member consisting of alumina ($Al_2O_3$) ceramic or sapphire.

However, a wire guide member made of such a material has only a limited wear resistance when accompanied by increases in both printing speed and the number of printing operations performed by the printer wires. Thus, upon exceeding a predetermined printing speed or a predetermined number of printing operations, the guide holes wear significantly and the wire guide member cannot then be used.

Along with high-speed processing demands in computers, a high printing speed is also required for a dot matrix printer. In order to improve printing precision, the number of pins tends to be increased. However, a conventional wire guide member cannot provide satisfactory durability under conditions of such an increase in both the printing speed and the number of pins.

SUMMARY OF THE INVENTION

The present invention has been made in consideration of the above situation, and has, as its object, to provide a guide member which has excellent wear resistance and durability as a guide member of print wires for a dot matrix printer.

The present inventors have found that the above object can be achieved by a printer guide member having the following construction. The printer guide member according to the present invention comprises a ceramic sintered body containing 60% by weight or more of $Si_3N_4$ and having a plurality of guide holes, the ceramic sintered body further containing:

(a) 10% by weight or less of $Al_2O_3$, and (b) at least one component, as an additive, selected from the group consisting of:

(i) 10% by weight or less of a rare earth element oxide, (ii) 10% by weight or less of AlN, and (iii) 10% by weight or less of at least one oxide selected from the group consisting of $TiO_2$, MgO, and $ZrO_2$.

$Al_2O_3$, as the component (a), is, preferably, contained in an amount of 1% by weight or more, and the total amount of additives is preferably 1 to 30% by weight and, more preferably, 5 to 20% by weight.

When 10% by weight or less of one or both of WC and $Mo_2C$ is added to the ceramic sintered body, the strength is further improved.

In order to provide satisfactory wear resistance and durability, the sintered body to be used for the guide member of the present invention must have a high density. For this purpose, the sintered body should have, preferably, a porosity of 5% or less.

The guide member of the present invention can be manufactured by the following methods. In one method, a desired element is prepared from a powder having a predetermined composition by molding or sheet molding, and the element is pre-drilled. Alternatively, the element may be presintered to a machinable hardness at a temperature lower than the vitrification temperature, pre-drilled, sintered at a normal vitrification temperature in an $N_2$ atmosphere, machined to a predetermined size, and, finally, drilled. Final drilling includes rounding of the edges of the upper and lower openings of the holes, and precise adjustment of the hole size. In this final drilling process, whiskers (needle-like or fibrous crystals having an aspect ratio (length-/diameter) of 3 or more, and preferably 3 to 10) formed in layers of 1 to 30 $\mu m$ thickness on the inner surface of each hole upon sintering are, preferably, left unremoved. This is because the whiskers consist of single crystals and have excellent wear resistance. According to an experiment performed, when the whisker layer was completely removed by final drilling, the guide life was about $8 \times 10^8$ dots. However, when the whisker layer was not removed by final drilling, the guide life was extended to about $10^9$ dots.

According to another method, a sintered body is prepared by a normal sintering method or hot press method from a powder having a predetermined composition. The sintered body is machined to a predetermined size, and guide holes are formed in the sintered body, for example, by laser machining (pre-drilling) or wire polishing (final drilling).

DETAILED DESCRIPTION OF THE PREFERRED EMBODIMENT

Figure 1:
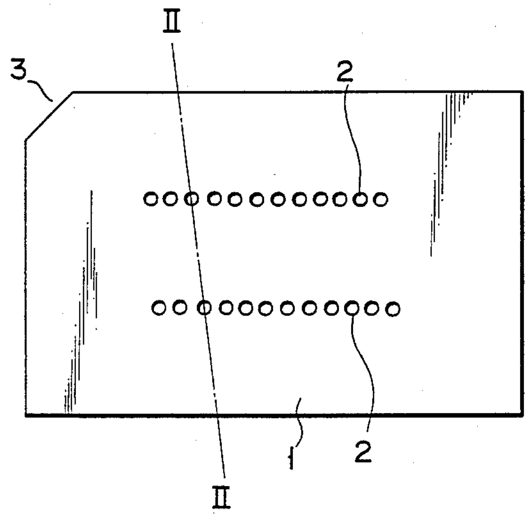
FIG. 1 is a plan view showing a wire guide member for a dot matrix printer according to an embodiment of the present invention.
Figure 2:
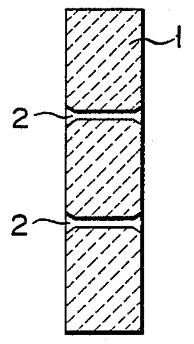
FIG. 2 is a sectional view of the wire guide member shown in FIG. 1 along the line II—II therein.

FIG. 1 shows a wire guide member 1 for a dot matrix printer according to an embodiment of the present invention. Two arrays of guide holes 2 are formed in a slightly staggered manner in a plate-like sintered body having a thickness of about 1 mm. The guide holes 2 have a diameter of, e.g., about 0.22 mm and extend through the sintered body along its direction of thickness, as shown in FIG. 2. The pitch and the like of the guide holes 2 can be suitably selected in accordance with printer wires to be inserted into the guide holes 2, as needed. Referring to FIG. 1, reference numeral 3 denotes a chamfered portion which is used to correctly position the sintered body for drilling and assembly.

EXAMPLE

A mixed powder obtained by adding 5 parts by weight of $Y_2O_3$, 3 parts by weight of AlN, and 4 parts by weight of $Al_2O_3$ to 100 parts by weight of $Si_3N_4$, was molded and presintered at about 1100° C. The presintered body was drilled and then sintered at a normal vitrification temperature of about 1,750° C. for 2 hours ($N_2$ atmosphere), after which it was machined to a predetermined size. Guide hole edges were rounded by barrel polishing and slight wire polishing to form guide holes having a diameter of 0.22 mm. Thus, a wire guide member for a dot matrix printer as shown in FIG. 1 was manufactured. A whisker layer having a thickness of 10 to 30 μm was confirmed to have formed on the inner wall of the guide holes.

The wire guide member was mounted on a printer, and a durability test was performed using WC printer wires and printing at a print speed of 240 c.p.s. (Characters Per Second).

As a Comparative Example, a wire guide member comprising a conventional sintered body of alumina ceramic was also prepared. The member was similarly mounted on the printer and a durability test was performed under the same conditions as mentioned above.

Table 1 shows the properties of the wire guide members in the Example and Comparative Example. Table 2 shows the results obtained.

TABLE 1

| Properties | | Example | Comparative Example |
|---|---|---|---|
| Density | (gr/cm$^3$) | 3.2 | 3.8 |
| Hardness | (Hv) | 1700 | 1500 |
| Thermal Conductivity | (W/m °K.) | 15.5 | 20.0 |
| Coefficient of Thermal Expansion | (× 10/°C.) | 3.4 | 8.6 |
| Bending Strength | (at normal temperature) | 80 | 35 |
| (Kgf/mm$^2$) | 1000° C. | 70 | 20 |

TABLE 2

| | Example | Comparative Example |
|---|---|---|
| Print Speed | 240 c.p.s | 240 c.p.s |
| Print Wire Material | WC | WC |
| Wire Guide Life | $8 \times 10^8$–$10^9$ dots | $10^8$–$2 \times 10^8$ dots |

As can be seen from Table 2 above, the wire guide member of the present invention experiences substantially no wear to its guide holes upon printing $8 \times 10^8$ dots, and allows for clear, sharp printing. In contrast, in the wire guide member comprising a conventional alumina ceramic sintered body, the guide holes were worn and intervals between adjacent holes were broken upon printing about $2 \times 10^8$ dots. Sharpness of printing was impaired and no further printing could be performed.

In the above Example, $Al_2O_3$ and $Y_2O_3$ were added to $Si_3N_4$ to prepare a printer guide member. However, when powders having the compositions (% by weight) shown in Table 3 were similarly tested, results similar to those of the above Example were obtained.

TABLE 3

| Example | $Si_3N_4$ | $Y_2O_3$ | $Al_2O_3$ | AlN | $TiO_2$ | CeO | MgO | $ZrO_2$ | WC | $Mo_2C$ |
|---|---|---|---|---|---|---|---|---|---|---|
| 2 | 100 | 5 | 2 | — | — | — | — | — | — | — |
| 3 | 100 | 5 | 2 | 2 | — | — | — | — | — | — |
| 4 | 100 | 5 | 4 | 3 | — | — | — | — | — | — |
| 5 | 100 | 5 | 3 | 3 | 1.5 | — | — | — | — | — |
| 6 | 100 | 5 | 3 | 3 | — | — | — | — | — | 1.5 |
| 7 | 100 | 5 | 3 | 3 | — | — | — | — | 1.5 | — |
| 8 | 100 | — | 4 | 3 | 1.5 | 5 | — | — | — | — |
| 9 | 100 | 5 | 2 | — | — | — | 2 | — | — | — |
| 10 | 100 | 5 | 2 | — | — | — | — | 2 | — | — |

What is claimed is:

1. A printer guide member comprising:

a ceramic sintered body having a plurality of guide holes therein, each said guide hold having an inner surface on which is formed a layer of whiskers, said sintered body consisting essentially of:

(a) not less than 60% by weight of $Si_3N_4$;

(b) not more than 10% by weight of $Al_2O_3$; and (c) at least one component, as an additive, selected from the group consisting of:

(i) not more than 10% by weight of a rare earth element oxide, (ii) not more than 10% by weight of AlN, and (iii) not more than 10% by weight of at least one oxide selected from the group consisting of $TiO_2$, MgO and $ZrO_2$.

2. A guide member according to claim 1, wherein said ceramic sintered body has an Si-Al-O-N (Sialon) phase.

3. A guide member according to claim 1, wherein the whiskers have an aspect ratio of 3 or more.

4. A guide member according to claim 1, wherein the whiskers have a total thickness of 10 to 30 μm.

5. A guide member according to claim 1, wherein said ceramic sintered body has a porosity of not more than 5%.

6. A guide member according to claim 1, wherein the rare earth element oxide is yttrium oxide.

7. A guide member according to claim 1, wherein the rare earth element oxide is cerium oxide.

8. A guide member according to claim 1, wherein the component (b) is contained in an amount of not less than 1% by weight.

9. A guide member according to claim 1, wherein the component (c) is contained in an amount of 1 to 30% by weight.

10. A guide member according to claim 9, wherein the component (c) is contained in an amount of 5 to 20% by weight.

11. A guide member according to claim 1, wherein said guide member is used as a guide for print wires of a dot matrix printer.

* * * * *